F. D. WILLEY.
KILN.
APPLICATION FILED FEB. 11, 1911.

996,442.

Patented June 27, 1911.

3 SHEETS—SHEET 1.

Witnesses:
Frank W. Bemas
Eleanor Hagenow

Inventor:—
F. D. Willey
By: Pierce, Fisher & Clapp
Attys.

F. D. WILLEY.
KILN.
APPLICATION FILED FEB. 11, 1911.

996,442.

Patented June 27, 1911.

3 SHEETS—SHEET 3.

Witnesses:
Inventor:—
F. D. Willey
By:
Attys.

UNITED STATES PATENT OFFICE.

FREDERICK D. WILLEY, OF CHICAGO, ILLINOIS, ASSIGNOR TO CHICAGO VARNISH COMPANY, OF CHICAGO, ILLINOIS, A CORPORATION.

KILN.

996,442.  Specification of Letters Patent.  Patented June 27, 1911.

Application filed February 11, 1911. Serial No. 608,050.

*To all whom it may concern:*

Be it known that I, FREDERICK D. WILLEY, a citizen of the United States, and a resident of Chicago, county of Cook, and State of Illinois, have invented certain new and useful Improvements in Kilns, of which I do declare the following to be a full, clear, and exact description, reference being had to the accompanying drawings, forming part of this specification.

The present invention has for its object to provide a simple and effective kiln which, while susceptible of more general application, is especially designed for the drying of piano cases, vehicle bodies or like articles that have been painted or varnished.

The invention consists in the features of novelty hereinafter described, illustrated in the accompanying drawings and particularly pointed out in the claims at the end of this specification.

Figure 1:
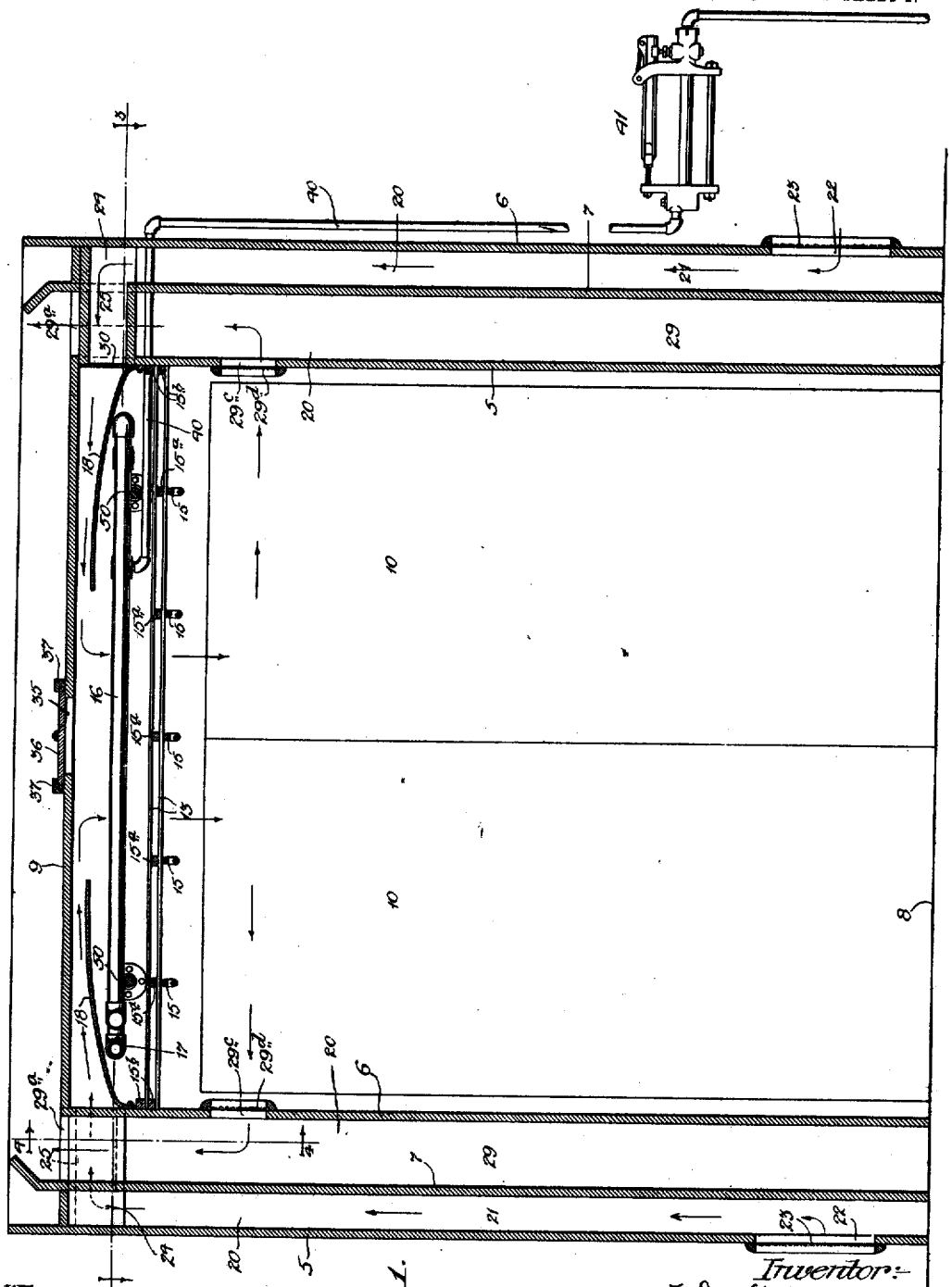
Figure 2:
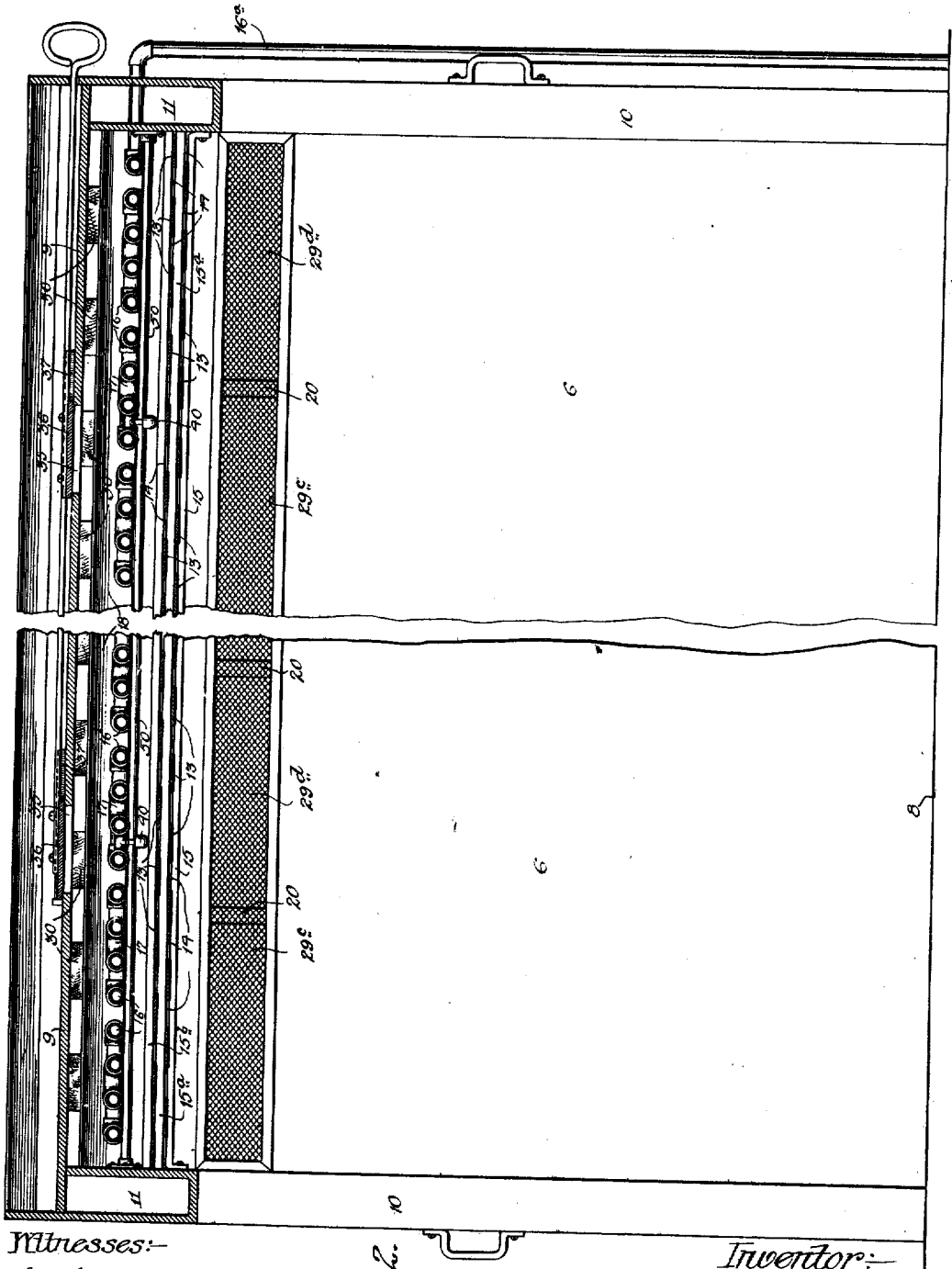
Figures 3, 4, 5:
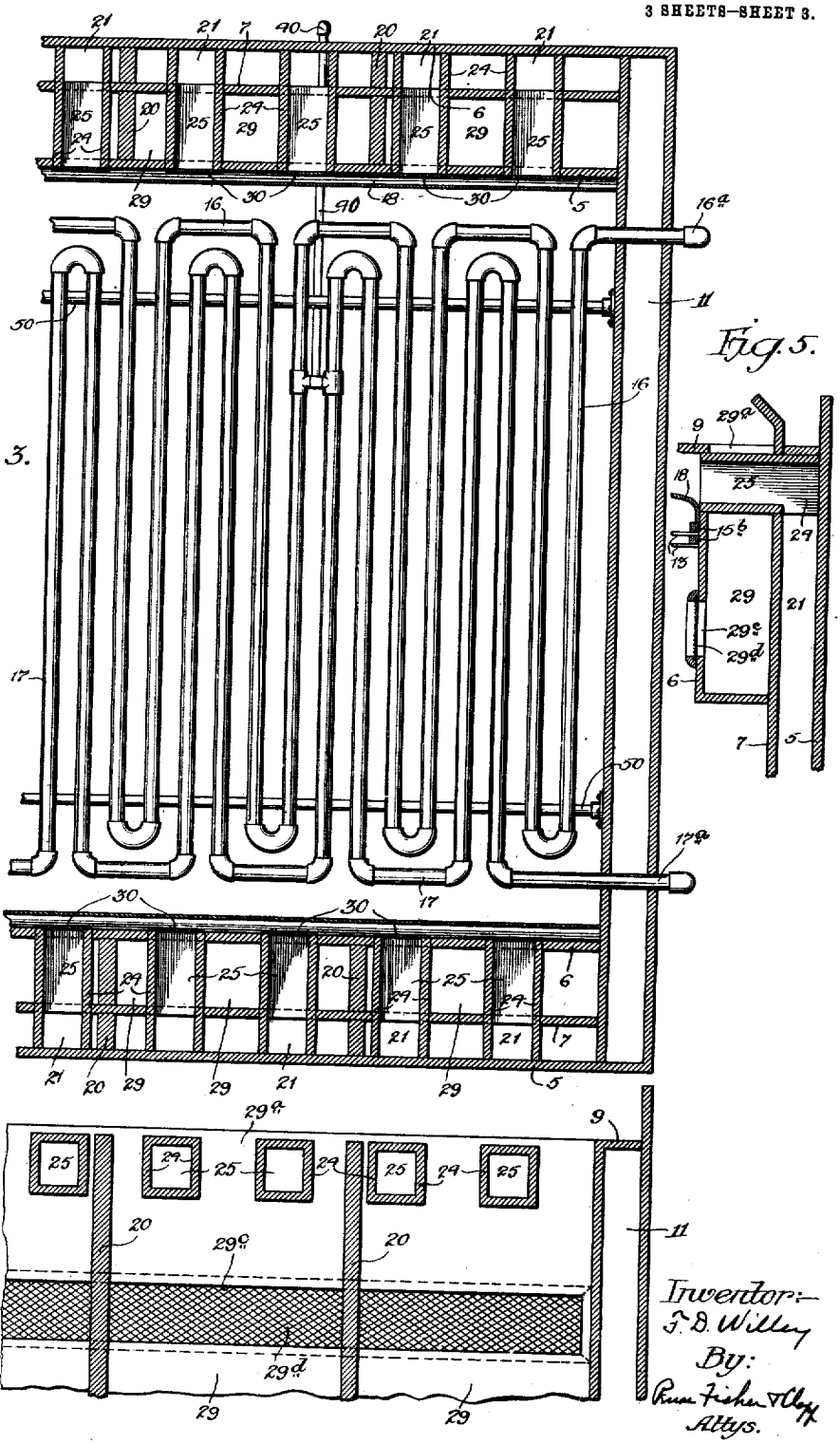

Figure 1 is a view in vertical cross-section through a kiln embodying my invention, parts being shown in elevation. Fig. 2 is a view in central, vertical, longitudinal section. Fig. 3 is a view in horizontal section on line 3—3 of Fig. 1. Fig. 4 is a view in section on line 4—4 of Fig. 1. Fig. 5 is a vertical section showing a slight modification of the invention.

The vertical sides of the kiln are shown as comprising inner and outer walls 5 and 6 and intermediate walls 7. These walls may be formed of matched lumber or of any other suitable material. The walls 5, 6 and 7 will rest upon a suitable floor or foundation 8 and a roof 9 will extend over the top of the kiln. The ends of the kiln will preferably be closed by doors 10 of any approved type, swinging doors of double thickness being shown in the drawing. Those portions 11 of the end walls about the doors 10 are preferably formed hollow (see Fig. 2) to more effectively retain the heat within the kiln.

At a suitable distance below the roof 9 of the kiln are arranged two rows of transverse strips 13, preferably of cotton duck, spaced apart and disposed alternately so that the strips 13 of the one row shall come opposite the spaces 14 of the other row. The strips 13 will be coated with asbestos paint in order to effectively protect them against the action of the heat from the steam pipes above them, and the purpose of the strips 13 is to prevent the direct radiation of heat from the superposed steam pipes 16 and 17 onto the articles within the drying chamber. Beneath the lower row of strips 13 extends a series of rods 15 that serve to support the strips, and between the lower and upper row of strips 13 extends a series of rods or bars 15$^a$ that serve to support and separate the upper strips 13 from the strips below them. The ends of the strips 13 will be conveniently attached to the strips 15$^b$ fastened to the side wall of the structure (see Fig. 1).

Above the steam pipes 16 and 17 extend the sheet metal plates 18, the outer edges of which plates are suitably fastened to the inner side walls of the kiln, the free inner edges of these plates terminating at a distance from the center of the drying chamber. In the preferred form of the invention (see Fig. 3) two sets of steam coils 16 and 17 are employed and live steam will be admitted to each of these coils 16 and 17 by separate induction pipes 16$^a$ and 17$^a$. The purpose in employing separate loops of steam pipes 16 and 17 arranged preferably one set within the other, as indicated in Fig. 3, is to enable the temperature of the drying chamber to be more conveniently regulated; and this can be effected by cutting out of service either of said sets of pipes 16 or 17.

The space between the side walls 5 and 7 will be divided by cross plates 20, so as to form air induction channels 21 which will extend from the bottom to the top of the walls. Each of the air induction channels 21 will be provided adjacent its bottom with an air port 22, preferably furnished with a screen 23 to arrest dust or foreign matter. At the top of the channels 21 are placed the parallel plates or strips 24 forming cross channels 25 that communicate with the tops of the channels 21 and these cross channels 25 will receive air from the vertical channels 21 and deliver it into the drying chamber above the metal plates 18.

At the inner end of each of the cross channels or ducts 25 is hung a curtain 30 of suitable flexible material, which will act as a valve, this curtain being moved slightly inward to permit air to pass from the channels or ducts 25 into the drying chamber, but serving to close against the ends of the channels or ducts 25 to prevent any back flow of air through the channels or ducts 25.

Preferably, the plates 20 that divide the space between the walls 5 and 7 to form the vertical induction channels 21 are also extended inward between the walls or plates 7 and form the air discharge channels 29, these channels extending upward between the short channels or ducts 25 and communicating with discharge openings 29ª through the roof of the kiln. The channels 29 are provided near the top of the drying chamber with discharge ports 29ᶜ preferably fitted with screens 29ᵈ, through which air, gases, etc., will pass from the top of the drying room into the channels 29 and thence out through the discharge ports or openings 29ª.

In the roof 9 of the kiln are preferably arranged at convenient intervals apart, suitable discharge ports or openings 35 that may be normally closed by covers 36, these covers being mounted to slide in guides 37, so that the covers may be arranged to either partially or wholly close the ports 35 and thus aid in regulating or modifying the temperature of the kiln.

The steam pipes 16 and 17 in the drying chamber may be provided with suitable pipes 40 for carrying off the water of condensation, one only of these pipes 40 being shown. This condensation pipe 40 will lead from the drying chamber to a point outside the kiln and will there be provided with a suitable automatic device 41 for effecting the discharge of water of condensation, while at the same time preventing the waste of steam from the pipes 16 and 17. Any suitable form of valve controlling mechanism for effecting the automatic discharge of the water of condensation may be employed.

The steam pipes 16 and 17 are shown as conveniently supported by means of transverse bars 50 (see Fig. 3), the ends of which are suitably secured to the walls of the kiln.

From the foregoing description the operation of the kiln will be understood to be as follows: The articles to be dried having been placed within the drying chamber, the doors 10 of this chamber will be closed, and steam will be admitted into the heating pipes 16 and 17. Air will then enter by the ports 22 and will pass up through the air induction channels 21 and cross channels or ducts 25 into the drying chamber at points above the plates 18. The air becoming heated in the top of the chamber will expand, and inasmuch as the curtains or valves 30 will prevent any back flow of air into the channels 25 and 21, the heated air will pass down into the drying chamber and will escape through the ports 29ᶜ, the discharge channels 29 and the ports 29ª to the atmosphere. When the temperature is thus raised within the drying chamber, the painted or varnished articles therein will give off, in the process of evaporation of the volatile constituents of the paint or varnish, fumes which will rise to the top of the drying chamber and will escape through the ports 29ᶜ. A circulation of air will thus be established, as indicated by the arrows in Fig. 1 of the drawing, i. e., up through the air admission ports 21, and thence through the short ducts or channels 25, into the top of the drying chamber, thence down between the strips of duck 13 into the body of the chamber and thence outward through the discharge ports 29ᶜ, channels 29 and ports 29ª. The plates 18 which extend over the outer portions of the steam pipes insure the delivery of the air toward the center of the drying chamber and thus prevent its short circuiting to the discharge ports 29ᶜ of the channels 29.

In practice it has been found that the body of air within the drying chamber will soon become raised to the desired temperature, and that there is comparatively little difference in the temperature of the room in its lower and upper portions. In fact, the body of heated air within the drying chamber is maintained at so near a uniform temperature that a uniform drying of the articles within the chamber is effected, while the fumes that rise to the top of the chamber are constantly carried off.

I wish it understood that the precise details of construction above set out may be varied without departure from the spirit of the invention and that features of the invention may be employed without its adoption as an entirety. Thus, for example, it is not essential that the discharge channels 29 should extend below the ports 29ᶜ and in the modified form of the invention shown in Fig. 5 of the drawings, the discharge channels or ducts 29 are shown as terminating at the bottoms of the ports 29ᶜ.

The plates 18, which preferably extend from each side wall toward the center of the upper portion of the drying chamber, form a deflector that prevents the short circuiting of the air from the admission channels to the discharge channels. I do not wish the invention to be understood as restricted to the precise construction or arrangement of the deflector, since this may obviously be varied, so long as it serves the purpose of the invention.

Having thus described my invention what I claim as new and desire to secure by Letters Patent, is:—

1. A kiln of the character described comprising a drying chamber, provided in its upper portion with steam pipes, a deflector extending over said steam pipes to prevent the short-circuiting of the air, air admission channels for delivering air above said deflector and into the upper portion of said drying chamber and air discharge channels leading from said chamber.

2. A kiln of the character described comprising a drying chamber provided in its upper portion with steam pipes, deflecting plates extending partially over said steam pipes, air admission channels for delivering air above said plates and into the upper portion of said chamber and air discharge channels leading from the upper part of said chamber.

3. A kiln of the character described comprising a drying chamber provided in its upper portion with steam pipes, deflecting plates extending partially over said steam pipes from the walls of the kiln toward the center thereof, but leaving space for the downward passage of air, air admission channels for delivering air above said plates and into the upper part of said chamber and air discharge channels leading from the upper part of the drying chamber below said steam pipes.

4. A kiln of the character described comprising a drying chamber provided in its upper portion with steam pipes, a shield extending beneath said steam pipes and comprising upper and lower strips of material spaced apart and alternately disposed, air admission channels for delivering air into the top of said chamber and air discharge channels leading from the upper part of the drying chamber below the steam pipes.

5. A kiln of the character described comprising a drying chamber provided in its upper portion with steam pipes, a shield arranged below said steam pipes, said shield consisting of upper and lower strips of asbestos coated duck spaced apart, the strips of one row being arranged opposite the spaces between the strips of the other row, air admission channels for delivering air into the top of said chamber and air discharge channels leading from the upper part of said chamber below the steam pipes.

6. A kiln of the character described comprising a drying chamber provided with steam pipes arranged in its upper portion, air admission channels for delivering air into the upper portion of said chamber, said air admission channels being provided with valves to prevent the back flow of air, a screen extending across the upper part of said drying chamber, and air discharge channels leading from said drying chamber.

7. A dry kiln of the character described comprising a drying chamber having in its upper portion both air admission and air discharge ports and having steam pipes arranged in said upper portion between said admission and discharge ports, channels connected to said admission and discharge ports, and a screen extending across the upper part of said drying chamber immediately below said steam pipes.

8. A kiln of the character described comprising a drying chamber provided in its upper portion with steam pipes, a deflector arranged in said chamber above said steam pipes, said deflector being adapted to permit the downward passage of air, a shield arranged below said steam pipes, air admission channels in the walls of the kiln, said channels having induction openings at their lower ends and having their upper ends communicating with the drying chamber above said deflector and air discharge channels leading from the upper part of said drying chamber.

FREDERICK D. WILLEY.

Witnesses:
GEORGE P. FISHER,
KATHARINE GERLACH.

---

Copies of this patent may be obtained for five cents each, by addressing the "Commissioner of Patents. Washington, D. C."